United States Patent [19]

von Broock

[11] Patent Number: 4,858,900
[45] Date of Patent: Aug. 22, 1989

[54] MOUNTING SUPPORT ARRANGEMENT FOR AN ENGINE AND DRIVING ASSEMBLY OF A MOTOR VEHICLE WHICH OPERATES AT A LIMITED FREQUENCY RANGE

[75] Inventor: Ulrich von Broock, Weissach, Fed. Rep. of Germany

[73] Assignee: Dr. Ing. h.c.F. Porsche Aktiengesellschaft, Stuttgart, Fed. Rep. of Germany

[21] Appl. No.: 157,984

[22] Filed: Feb. 19, 1988

[30] Foreign Application Priority Data

Feb. 21, 1987 [EP] European Pat. Off. ........ 87102494.9

[51] Int. Cl.⁴ .................... B60G 15/04; F16M 13/00; B62D 21/00
[52] U.S. Cl. .................................... 267/219; 248/562; 180/312
[58] Field of Search ...................... 267/219, 121, 140.1, 267/113, 35, 220, 140.5, 292; 188/298; 248/562, 636, 638, 544; 123/192 R, 195 A; 180/300, 312, 11, 291, 299; 280/716, 671

[56] References Cited

U.S. PATENT DOCUMENTS

| 2,084,080 | 6/1937 | D'Aubarede | 180/300 |
| 2,254,282 | 9/1941 | Griswold | 180/312 |
| 3,018,990 | 1/1962 | Muller | 248/638 X |
| 3,473,620 | 10/1969 | Müller et al. | 180/11 |
| 4,572,321 | 2/1986 | Morita | 180/312 X |
| 4,643,405 | 2/1987 | Hofmann et al. | 267/219 |
| 4,693,217 | 9/1987 | Beer | 123/192 R X |

FOREIGN PATENT DOCUMENTS

| 3543835 | 7/1987 | Fed. Rep. of Germany | 180/300 |
| 57-144126A | 9/1982 | Japan . | |
| 0151637 | 8/1984 | Japan | 267/219 |
| 0222636 | 12/1984 | Japan | 267/219 |

Primary Examiner—Robert J. Oberleitner
Attorney, Agent, or Firm—Barnes & Thornburg

[57] ABSTRACT

A bearing arrangement for a drive assembly of a motor vehicle is suggested that has bearings, particularly hydro-bearings, that are arranged on both sides of the engine and elastically support the engine and the drive assembly with respect to the body of the vehicle. The bearings of the assembly on the side of the engine are arranged at the level of the center of gravity and at a distance to the engine and are vertically aligned in such a way that the spring travels of the essentially excited rigid-body vibrations of the assembly extend in the same direction as the vertical longitudinal axes of the bearings. Each compression movement of the bearing that results from a bouncing and pitching vibration and/or a rolling movement can be led to it separately and can be damped jointly.

2 Claims, 2 Drawing Sheets

4,858,900

MOUNTING SUPPORT ARRANGEMENT FOR AN ENGINE AND DRIVING ASSEMBLY OF A MOTOR VEHICLE WHICH OPERATES AT A LIMITED FREQUENCY RANGE

BACKGROUND AND SUMMARY OF THE INVENTION

The invention relates to a mounting support arrangement of a motor vehicle of the type having hydro-bearings arranged at both sides of a vehicle engine for supporting the engine with respect to a vehicle body.

Mounting support arrangements for drive assemblies of motor vehicles have become known where inclined mounting supports, at the body, are held in a plane that is arranged below the center of gravity of the assembly. The longitudinal axes of the mounting supports intersect in a point at the level of the center of gravity of the assembly.

During the operation of the vehicle, the drive assembly is excited to perform several movements that are caused by uneven road surfaces and/or by load change. With respect to the mounting supports, these movements of the assembly have different directions. Thus, movements in vertical direction may occur as bouncing movements, movements around a transverse axis may occur as pitching movements, and movements around a longitudinal axis of the assembly may occur as rolling movements. These different movements of the assembly are introduced into the inclined mounting supports at an obtuse angle or at an approximately right angle with respect to the longitudinal axis so that no maximum damping effect can be generated by the mounting supports because the direction of maximum damping can be achieved only axially with respect to the mounting supports, i.e., in the direction of the bearing longitudinal axis. As a result, strong vibrations may occur in the frequency ranges that are annoying to human beings. These vibrations cannot be effectively damped and have a negative effect on the travel comfort.

It is an objective of the invention to provide a mounting support for a drive assembly of a motor vehicle that ensures an improved travel comfort as a result of a more favorable vibrating behavior of the drive assembly.

The main advantages that are achieved by means of the invention consist of an improvement of the travel comfort by means of an optimal damping of assembly movements, such as the bouncing, pitching and rolling movements or their vibration forms. These vibrations are effectively damped by means of the mounting supports that are arranged at the level of the point of the center of gravity because in their maximum damping direction, the movements are absorbed that result from the bouncing, pitching and rolling.

These movements of the assembly that, according to the invention, are aligned only with respect to the centric longitudinal axis of the mounting supports, avoid a distorting of the mounting support in the different directions as according to the known construction.

By means of a defined length of the supporting arms of the mounting support of the engine, in the case of the use of hydro-mounting support, such a coordination can be achieved that the rolling frequency of the assembly is in a favorable damping range of the respective hydro-bearings. These hydro-mounting-supports can be of any known construction.

By means of the mounting support arrangement according to the invention, particularly a load change jolting, a constant drive jolting and an engine sputtering or missing caused by road surface bumps can be improved effectively.

Other objects, advantages and novel features of the present invention will become apparent from the following detailed description of the invention when considered in conjunction with the accompanying drawings.

DETAILED DESCRIPTION OF THE DRAWINGS

Figure 2:
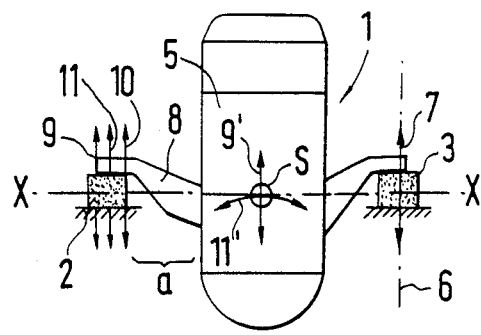
FIG. 2 is a schematic end view of an arrangement of a drive assembly mounting support assembly according to a preferred embodiment of the invention with vertically aligned engine mounting supports.
Figure 3:
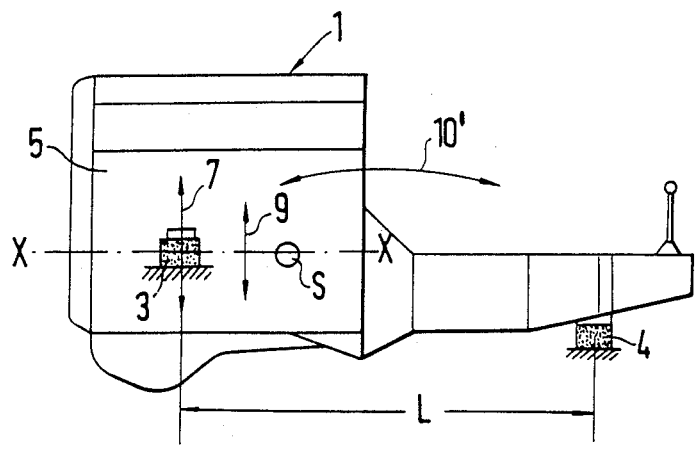
FIG. 3 is a schematic lateral view of the drive assembly of FIG. 2 with engine and transmission mounting supports.

According to FIGS. 2 and 3, a motor vehicle has a drive assembly 1 with two vertically aligned engine mounting supports 2 and 3 and at least one transmission mounting support 4. The bearings 2 and 3 are arranged at both sides of an engine 5 in supporting arms 8 at a distance (a) and in a horizontal plane X—X that extends through the center of gravity S of the whole assembly. The mounting supports 2 and 3 are hydro-mounting supports with maximum damping movements in the direction of their longitudinal axes 6.

The individual rigid-body vibrations of the assembly 1 that are caused by outside excitations, when the mounting supports 2 and 3 are arranged in the plane X—X through the center of gravity S, result in almost vertical movements at the mounting supports points. In FIG. 3, these movements at the mounting supports 3 are represented symbolically by means of arrows 9, 11 and 10. The bearing 3 is also loaded in a manner corresponding to the bearing 2 which is not shown in detail.

These movements, in their directions, coincide with the longitudinal axes 6 of the mounting supports and therefore with the direction of the maximum damping of the bearings 2 and 3.

Figure 1:
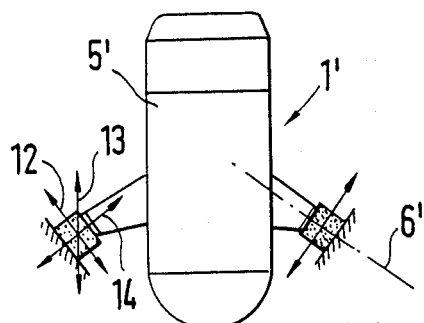
FIG. 1 is a schematic end view of an embodiment of a drive assembly bearing arrangement constructed according to the state of the art with inclined hydro-bearings.

In contrast, in the state of the art according to FIG. 1, the mounting supports are inclined with respect to the engine 5' and have longitudinal axes 6' that form an intersection. By means of the adjustment of the two mounting supports, vibration forms are excited that, in the case of a rolling of the assembly, result in a spring travel in the direction of the arrow 12, and in the case of a bouncing movement, in the direction of the arrow 13, in which case the maximum damping can take place only in the direction of the arrow 14, i.e., centrically with respect to the longitudinal axis 6'.

Figure 5:
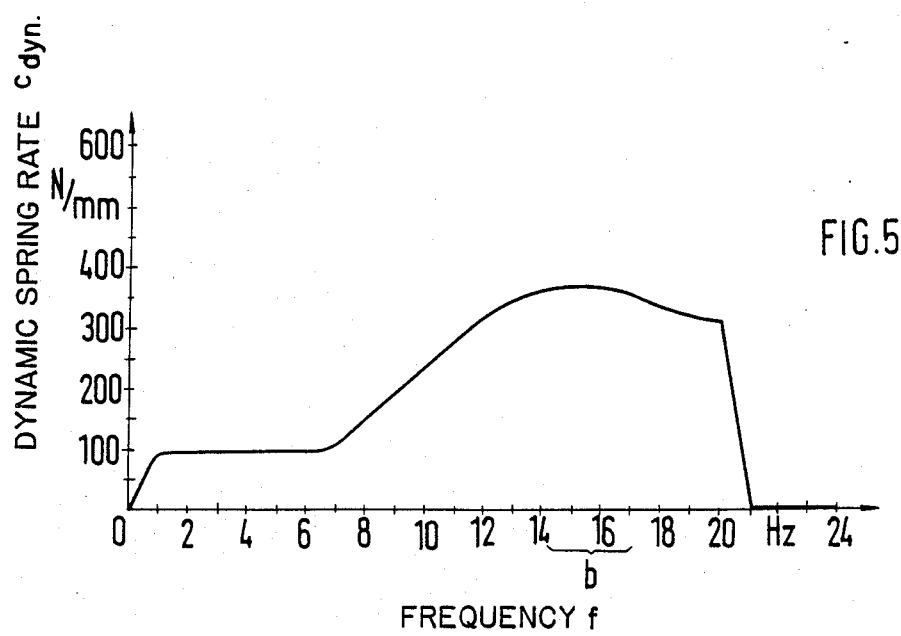
FIG. 5 is a chart of a dynamic spring rate of a hydro-mounting support of the type used in preferred embodiments of the invention.
Figure 6:
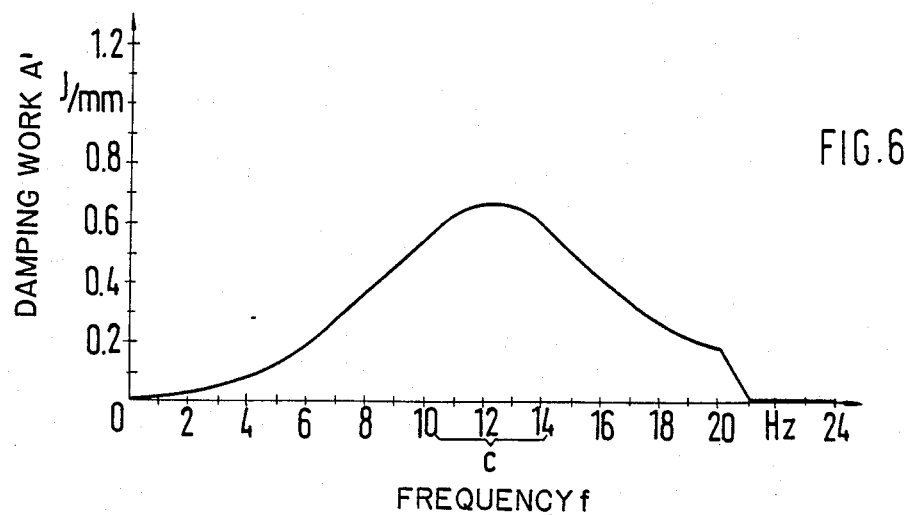
FIG. 6 is a chart of a frequency-dependent damping of a hydro-mounting support of the type used in preferred embodiments of the invention.

According to the invention, particularly hydro-mounting supports are used as engine mounting supports that have a specific course of a mounting support characteristics, as shown in FIG. 5, for example, by means of curves. In the 11 Hz+range (Eg; Section "b" of FIG. 5), the maximum dynamic spring rate (Newtons/millimeters) is reached in the case of the hydro-bearing. Normally, a distinctive damping maximum exists in this range as depicted at Section "c" of FIG. 6 (Joules/millimeter).

So that the rolling frequency of the assembly 1 is in this range, the supporting arms 8 have a corresponding length (a). In the case of shorter supporting arms 8, the rolling frequency, for example, will be only 6 Hz and will then be in the range of lower rigidity of only 100 N/mm, and in the case of the mounting support that is shown as an example, there will be almost no damping.

The tuning of the natural frequency of the rigid-body vibrations of the assembly leads to an acoustic advantage. When the optimal rigidity and damping values of a hydro-mounting support are utilized, the basic rigidity can be lowered considerably and thus the insulation behavior can be clearly improved.

In order to achieve a distinctive pitching movement (direction of the Arrow 10' in FIG. 3) of the assembly 1, the space from the engine mounting supports 2, 3 to the transmission mounting support 4, must have a distance L that is as large as possible. These pitching movements may be coupled with the bouncing movements which does not cause any significant change of the effect on the mounting support according to FIG. 2 corresponding to arrow directions 9, which relates to the bounce shown by force 9'; 10 which relates to the lengthwise pitching force 10' (FIG. 3) and 11 which relates to the sideways rolling force 11'. The right-hand side of FIG. 2 shows these arrows in summary as arrow 7. The spring stiffness of the mounting support in its axial direction 6 as compated to its transverse direction X is in ratio of 1:0.7.

The rigidity of the mounting supports, and the distances between them and the mast moment of inertial of the supported weight are the factors commonly recognized as determinative of the frequency response of the mounting support. As well as to the determination as to whether the mounts absorb the forces: vertically, horizontally or at an angle. Thus by proper selection of the distance between the supports a mounting arm can be selected to cause the moment to operate at a desired frequency and in the desired direction.

In particularly preferred embodiments, the bearing arrangement according to the invention is used for vehicles with a forward drive assembly that, for the drive of the rear wheels, has a cardan shaft.

Figure 4:
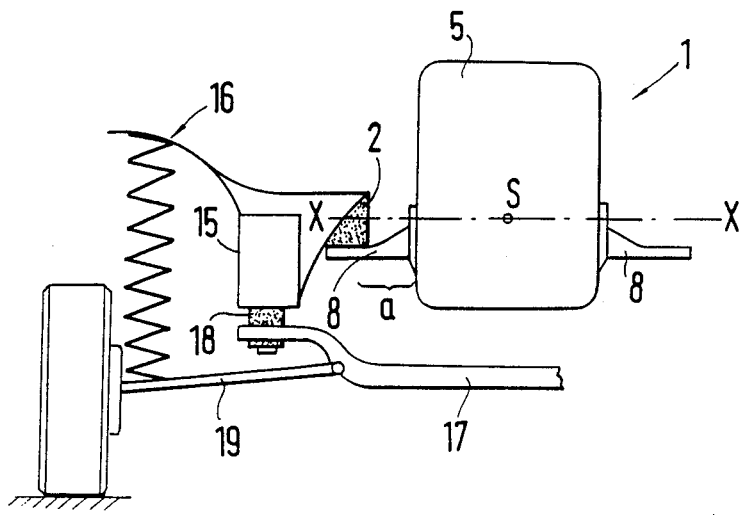
FIG. 4 is a diagrammatic front view representation of another embodiment of the engine mounting supports arranged at the side member at the vehicle body and of a subframe that is held elastically at the side member.

As shown in detail in FIG. 4, the bearings 2 and 3 are supported directly at a side member 15 of the vehicle body 16, and a subframe 17 is fastened at the side member 15 via elastic elements 18 in the area of the bearings 2, 3. A wheel support 19 is schematically shown and is spring connected to said vehicle body 16. The bearing location at the side member 15 is provided at a site of high impedance, in which case, in addition, local reinforcements may be mounted. This arrangement of the bearings 2, 3, beyond the optimized vibration damping of the assembly 1 in the bearings 2, 3, also has the effect that engine-excited residual vibrations are not introduced into the vehicle body 16 for a noise deterioration, to which the subframe 17 also contributes that is elastically fastened separately at the side member 15 and at which only the wheel suspension links are coupled.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A mounting support arrangement for an engine and drive assembly of a motor vehicle having hydro-mounting-supports that are arranged at both sides of the engine and that elastically support the engine and the drive assembly with respect to the vehicle body, wherein the hydro-mounting-supports on the engine sides are vertically aligned and arranged at a level of the center of gravity (S) of the engine and drive assembly and at a distance (a) with respect to the engine such that essentially excited rigid-body vibrations of the engine and drive assembly extend substantially in the same direction as the vertical longitudinal axes of the hydro-mounting-support, each compression movement of the mounting-support resulting from a bouncing and pitching and/or rolling movement of the engine and drive assembly can be led to it separately and can be damped jointly in the vertical direction of the hydro-mounting-support, and wherein the ratio of the spring stiffnesses of the mounting-supports in an axial vertical direction and in a transverse and horizontal direction is 1:0.7.

2. A mounting support arrangement for an engine and drive assembly of a motor vehicle having hydro-mounting-supports that are arranged at both sides of the engine and that elastically support the engine and the drive assembly with respect to the vehicle body, wherein the hydro-mounting-supports on the engine sides are vertically aligned and arranged at a level of the center of gravity (S) of the engine and drive assembly and at a distance (a) with respect to the engine such that essentially excited rigid-body vibrations of the engine and drive assembly extend substantially in the same direction as the vertical longitudinal axes of the hydro-mounting-support, each compression movement of the mounting-support resulting from a bouncing and pitching and/or rolling movement of the engine and drive assembly can be led to it separately and can be damped jointly in the vertical direction of the hydro-mounting-support, wherein supporting arms extend between the engine and the hydro-bearing-supports to allow the latter to support the former and wherein these arms have such a length (a) that a rolling frequency of the engine and drive assembly is in the frequency range (b) of the highest dynamic spring stiffness and in the range (c) of the highest damping effect of the respective mounting-supports and wherein the ratio of spring stiffnesses of the mounting-supports in an axial vertical direction and in a transverse and horizontal direction is 1:0.7.

* * * * *